United States Patent
Bethouart

(10) Patent No.: US 10,604,663 B2
(45) Date of Patent: Mar. 31, 2020

(54) CORRECTION FLUID

(71) Applicant: SOCIETE BIC, Clichy (FR)

(72) Inventor: Carine Bethouart, Neufchatel-Hardelot (FR)

(73) Assignee: SOCIETE BIC, Clichy (FR)

( * ) Notice: Subject to any disclaimer, the term of this patent is extended or adjusted under 35 U.S.C. 154(b) by 19 days.

(21) Appl. No.: 16/083,305

(22) PCT Filed: Mar. 7, 2017

(86) PCT No.: PCT/FR2017/050502
§ 371 (c)(1),
(2) Date: Sep. 7, 2018

(87) PCT Pub. No.: WO2017/153674
PCT Pub. Date: Sep. 14, 2017

(65) Prior Publication Data
US 2019/0077977 A1 Mar. 14, 2019

(30) Foreign Application Priority Data
Mar. 7, 2016 (FR) ...................... 16 51863

(51) Int. Cl.
*C09D 10/00* (2006.01)
(52) U.S. Cl.
CPC .................... *C09D 10/00* (2013.01)
(58) Field of Classification Search
CPC ..................................................... C09D 10/00
USPC ........................................................ 523/161
See application file for complete search history.

(56) References Cited

U.S. PATENT DOCUMENTS

| | | | |
|---|---|---|---|
| 5,290,839 | A | 3/1994 | Hegedus et al. |
| 5,338,348 | A | 8/1994 | Savin |
| 2004/0130606 | A1 | 7/2004 | Tawaraya et al. |
| 2014/0249256 | A1 | 9/2014 | Kordosh |

FOREIGN PATENT DOCUMENTS

| | | |
|---|---|---|
| JP | 6-122845 | 5/1994 |
| JP | 7-166114 | 6/1995 |
| JP | 2008-115205 | 5/2008 |
| JP | 2011-213824 | 10/2011 |
| WO | 2007116678 | 10/2007 |

OTHER PUBLICATIONS

Machine-generated English-language translation of JPH07166114A. (Year: 1995).*
International Search Report dated Jun. 14, 2017 in corresponding International PCT Application PCT/FR2017/050502, 7 pages.
Written Opinion dated Jun. 14, 2017 in corresponding International PCT Application PCT/FR2017/050502, 10 pages.

* cited by examiner

*Primary Examiner* — Vu A Nguyen
(74) *Attorney, Agent, or Firm* — Ohlandt, Greeley, Ruggiero & Perle, L.L.P.

(57) ABSTRACT

A correction fluid includes an organic solvent, a dispersing and wetting agent having a polyamine amide of polycarboxylic acid obtained by reacting a fatty acid dimer and a diamine, the fatty acid being a C14 to C22 fatty acid, an opacifier to a concentration of between 37 and 60% by weight relative to the total weight of the correction fluid, a resin, and optionally, an additive.

20 Claims, No Drawings

US 10,604,663 B2

CORRECTION FLUID

CROSS REFERENCE TO RELATED APPLICATIONS

This application is a national stage application, filed under 35 U.S.C. § 371, of International Patent Application No. PCT/FR2017/050502, filed on Mar. 7, 2017, which is incorporated by reference herein in its entirety.

BACKGROUND

1. Field

The present invention relates to correction fluids based on organic solvent.

2. Description of Related Art

Correction fluids are white, opaque fluid products intended to correct marks made by a writing implement, in particular a pen. Such fluids are thus applied to the mark present on a piece of paper and when they dry they provide a film which covers the erroneous mark. A correction mark may then be applied to the dry film.

Two types of physically drying fluids (evaporation of solvents) are currently available on the market:
  based on organic solvent: quick-drying but release VOCs.
  water-based: non-toxic but slow-drying, generally with a drying time >60 s.

Another existing corrector system is that of the roller, but in this case the formula is a dry formula, and although drying is very rapid and does not release VOCs, the technology is completely different.

The formulation of a correction fluid is similar to that of a paint but the viscosity thereof is low (so as to have good spreading: it is generally between 50 and 100 cPs when it is measured with an Anton Paar model MCR 301 rheometer at a shear rate of 100 s$^{-1}$ and a measurement temperature of 10° C.) and the percentage of white pigment is high (so as to have an excellent coverage with a single application of film: the conventional percentage of white pigment in correction fluids is approximately 40% by weight relative to the total weight of the correction fluid, and it is generally always greater than 37% by weight relative to the total weight of the correction fluid). These two parameters (low viscosity and high content of white pigment) represent a disadvantage for retaining good storage stability of the fluid and in particular good rehomogenization of the fluid during use by consumers.

The rehomogenization problems tend to increase as the correction fluid ages. Thus, a correction fluid that can be easily and rapidly rehomogenized experiences a decrease in this ease and speed of rehomogenization over the course of its shelf life, which may pose a problem to the consumer. Indeed, consumers have to shake the products before use so as to obtain a homogeneous fluid. If consumers do not shake the product sufficiently, for example because the fluid does not rehomogenize sufficiently easily and/or rapidly, the fluid, during use thereof, is not homogeneous and can block the exit of its application instrument. In particular, fluids having rehomogenization problems cannot be packaged in correction fluid pens, which have a smaller exit point than bottles with brush-type applicators. In addition, the application of the correction fluid is then not uniform, regardless of the application device (either the film is too thick and dries poorly, or too thin and allows the underlying mark to be seen).

In order to improve the dispersion of the white pigment, in general titanium dioxide, in the solvent of the correction fluid, and therefore the rehomogenization capacity thereof, dispersants are added to correction fluid formulations.

Thus, application JP06-122845 describes the use of polyamine carboxylic acid partial salts and in particular in its examples DISPERBYK-130® sold by BYK (solution of polyamine amides of unsaturated polycarboxylic acids obtained by reaction between an unsaturated C$_{18}$ fatty acid trimer and triethylenetetramine) as dispersant in a correction fluid based on organic solvent. This dispersant improves the dispersion of titanium oxide (white pigment) in the correction fluid and the opacifying ability thereof.

Application JP2008/115205 describes the use of a polyamine amide phosphate such as ANTI-TERRA P sold by BYK in correction fluids based on organic solvent, on acrylic resin and on TiO$_2$, to improve the opacifying properties.

Application JPH07166114 describes the use of polyaminoamides as additive in correction fluids based on organic solvent. The general formula covers a large number of additives and a large number of commercial products are mentioned in paragraph [0019], including ANTI-TERRA P, ANTI-TERRA U and DISPERBYK-130®, sold by BYK, which are also exemplified.

SUMMARY

However, the inventors noticed, surprisingly, that a particular dispersant, a polyamine amide of carboxylic acid obtained by reaction between a fatty acid dimer and a diamine, the fatty acid being a C14 to C22 fatty acid, such as ANTI-TERRA 205 or ANTI-TERRA 204 sold by BYK, makes it possible to obtain a correction fluid having better stability on aging and a greater ease and speed of rehomogenization (example 3) compared to a correction fluid not containing same (example 4) and compared to the dispersants exemplified in the prior art and in particular to DISPERBYK-130®, to ANTI-TERRA P and to ANTI-TERRA U sold by BYK.

Application JPH07166114 does indeed mention ANTI-TERRA 204 sold by BYK but among numerous other commercial products including ANTI-TERRA P, ANTI-TERRA U and DISPERBYK-130® which do not give good results of rehomogenization stability over time (example 3). In addition, none of the examples in this document use ANTI-TERRA 204 and nothing suggests using it preferentially to the other additives mentioned.

The present invention is therefore an inventive selection of the dispersant, surprisingly making it possible to obtain better rehomogenization stability over time, from among all those mentioned.

Documents U.S. Pat. Nos. 5,290,839, 5,338,348 and US2014/249256 also mention ANTI-TERRA 204 sold by BYK in their examples but only in coating compositions (in particular in anti-corrosion paints) and not in correction fluids.

In addition, in these examples, the amount of opacifier is always less than 37% by weight, which does not make it possible to have good coverage in a single application (a single deposit). The writing may be visible through the deposited film.

DETAILED DISCLOSURE

Therefore, the present invention relates to a correction fluid comprising:
- a—an organic solvent,
- b—a dispersing and wetting agent comprising a polyamine amide of polycarboxylic acid obtained by reaction between a fatty acid dimer and a diamine, the fatty acid being a C14 to C22 fatty acid, advantageously a polyamine amide salt of polycarboxylic acid,
- c—an opacifier at a content of between 37 and 60% by weight relative to the total weight of the correction fluid,
- d—a resin,
- e—and optionally an additive.

For the purposes of the present invention, "correction fluid" is intended to mean any white-colored opaque fluid containing an opacifier, such as a white pigment (in particular at a content before drying of between 37 and 60% by weight relative to the total weight of the correction fluid before drying and advantageously at a content after drying of between 50 and 90%, in particular of 75% by weight relative to the total weight of the correction fluid after drying) having a viscosity of between 50 and 150 cPs measured at 10° C. and at a shear rate of 100 s$^{-1}$ with the Anton Paar model MCR 301 rheometer, and intended to correct marks made by a writing implement, in particular a pen. In particular, the correction fluid is different from a paint and must have a rewritable drying time (that is to say the time after which it is possible to properly rewrite on the film) that is relatively short, precisely in order to enable such rewriting; more particularly, it is measured between 20 and 25 sec on a wet film 75 microns thick and 10 cm long applied with a hand coater (film applicator with 75 μm gap clearance (reference 1114 from Labomat or model 360 from Erichsen, or equivalent)), according to the following conditions:

The test is carried out in an air-conditioned, humidity-controlled room (23° C. (+/−2° C.)/50% (+/−5%) RH) on a piece of Baumgartner ISO12757 paper (21 cm×29.7 cm) arranged on a perforated vacuum table (22.8 cm×30.5 cm with holes with a 2 mm diameter, offset and spaced apart by 2.5 cm) with a film applicator with 75 μm gap clearance (reference 1114 from Labomat or model 360 from Erichsen, or equivalent) and a ball-point pen with black solvent-based ink and a ball with a 1 mm diameter.

The wet, 75 μm thick film, is applied in the direction of the width of the sheet.

As soon as the film measures approximately 10 cm long, the timer is started and the paper is placed on a stack composed of 5 sheets of paper (at least).

Starting from 10 seconds, and every 5 seconds, the first 7 letters of the word "correction" are written on the film using the ball-point pen; the tip of the pen is wiped with Kimwipes paper and 1 alpha is quickly drawn on scrap paper to ensure that the pen is writing correctly. The test is stopped when the characters are clear and complete for 2 consecutive time intervals, or when 120 seconds have passed.

The test sheet is then placed in front of a light source in order to check the homogeneity of the thickness of the dry film. The film is considered to be dry when it does not deform during writing, when the word written is clear and complete, and when the pen mark is continuous even if the pen has dragged away 2 or 3 minuscule particles of film. A mean is then made over 5 tests.

The correction fluid according to the invention is based on organic solvent.

For the purposes of the present invention, "correction fluid based on organic solvent" means any correction fluid, the solvent of which is an organic solvent. Advantageously, such a correction fluid does not contain water.

In particular, the organic solvent a) may be a halogenated hydrocarbon, an aliphatic hydrocarbon, such as, for example, a non-halogenated or alkylated cyclohexane, a low molecular weight alcohol or an alkylbenzene. More particularly, the organic solvent a) is chosen from aliphatic hydrocarbons that are advantageously non-halogenated. More advantageously, the organic solvent a) is chosen from pentanes, heptanes, octanes, cyclohexanes and/or hexanes that are in particular alkylated. Even more advantageously, the organic solvent a) is chosen from the group consisting of light alkylate naphtha, n-heptane, dimethylpentane, dimethylhexane, ethylpentane, methylhexane, methylcyclohexane, isooctane and mixtures thereof. This solvent may in particular be sold under the name EXXSOL® HEPTANE or under the name Isopar® E by Exxon Mobil. It may also be a mixture of these two solvents.

In a particularly advantageous embodiment of the present invention, the content of organic solvent a) of the correction fluid according to the invention is between 25 and 75% by weight, advantageously between 30 and 55% by weight, even more advantageously between 35 and 50% by weight, more particularly between 35 and 45% by weight, even more particularly between 40 and 45% by weight, relative to the total weight of the correction fluid.

The correction fluid according to the present invention therefore comprises a dispersing and wetting agent b) comprising (advantageously consisting of) a polyamine amide of polycarboxylic acid obtained by reaction between a fatty acid dimer and a diamine, the fatty acid being a C14 to C22 fatty acid, advantageously a polyamine amide salt of polycarboxylic acid, in particular dispersed in an organic solvent, more advantageously a saturated polyamine amide of polycarboxylic acid.

The function of this dispersing and wetting agent is to improve the dispersion of the white pigment in the solvent of the correction fluid, and in particular to facilitate the rehomogenization thereof, and therefore the aging over time of the correction fluid.

The fatty acid is therefore a $C_{14}$ to $C_{22}$, advantageously $C_{16}$ to $C_{20}$, more advantageously $C_{18}$ fatty acid, that is in particular unsaturated.

Advantageously, the diamine has the following general formula: NR1R2(CH$_2$)$_n$NR3R4, in which R1, R2, R3 and R4 represent, independently of one another, a hydrogen atom or a $C_1$-$C_6$ alkyl group, advantageously a hydrogen atom or a methyl group, and n represents an integer between 1 and 6, in particular between 2 and 4; advantageously, n=3. Advantageously, the diamine is N,N-dimethyl-1,3-propanediamine or 1,3-propanediamine or a mixture of these diamines.

For the purposes of the present invention, "$C_1$-$C_6$ alkyl group" is intended to mean any linear or branched alkyl group comprising from one to six carbon atoms, such as, for example, the methyl, ethyl, propyl, isopropyl, n-propyl, butyl, isobutyl, tert-butyl, pentyl, hexyl or n-hexyl group. Advantageously, it is a methyl group.

In particular, the dispersing and wetting agent b) may be ANTI-TERRA 204 or ANTI-TERRA 205 sold by BYK, more advantageously ANTI-TERRA 205.

The dispersing and wetting agent b) according to the invention is therefore not a phosphoric acid salt of polyamine amides of long-chain carboxylic acid such as ANTI-TERRA P, nor a salt of unsaturated polyamine amides and of low-molecular weight acidic polyesters such as ANTI-TERRA U, nor a solution of polyamine amides of unsaturated polycarboxylic acids obtained by reaction between an unsaturated $C_{18}$ fatty acid trimer and triethylenetetramine such as DISPERBYK 130, nor an alkylammonium salt of polycarboxylic acid.

Advantageously, the dispersing and wetting agent b) has at least one of the following features:
amine number: 37 mg KOH/g;
acid number: 40 mg KOH/g;
density at 20° C.: 0.9 g/ml;
percentage of non-volatile matter: 52%;
flash point: 24° C.

In addition, the dispersing and wetting agent b) may be dispersed in an organic solvent, such as, for example, a methoxypropanol/isoparaffinic hydrocarbon mixture, in particular in a 3/2 ratio.

In an advantageous embodiment of the present invention, the content of dispersing and wetting agent b) in the correction fluid according to the invention is between 0.01 and 10% by weight, advantageously between 0.03 and 5% by weight, in particular between 0.1 and 3% by weight, more advantageously between 0.5 and 2% by weight, relative to the total weight of the correction fluid. Advantageously, the dispersing and wetting agent b) acts by controlling flocculation. Its molecules have groups with pigment affinity which may bind to several pigments, thereby creating a network between the different pigments. The creation of this network makes it possible to increase the viscosity and slow down the sedimentation of the product, which will then be easily rehomogenizable.

The correction fluid according to the present invention also comprises an opacifier c).

For the purposes of the present invention, "opacifier" means any pigment, in particular white pigment, which makes it possible to give the correction fluid its coverage, that is to say its ability to completely cover and hide a writing mark. In particular, the opacifier c) is chosen from kaolin, calcium carbonate, titanium oxide and mixtures thereof, in particular from calcium carbonate, titanium oxide and mixtures thereof. It is advantageously titanium oxide ($TiO_2$) which has a superior opacifying power to kaolin and to calcium carbonate. The titanium oxide may be chosen from rutile titanium oxide, anatase titanium oxide or mixtures thereof, and may optionally have undergone an organic or mineral surface treatment, for example by means of aluminum oxide, silicon oxide or zirconium oxide, in particular aluminum oxide and silicon oxide. It may have a mean particle size ($D_{50}$) of between 0.2 μm and 0.4 μm, advantageously 0.21 μm. It may have a mean oil absorption of 37 (amount of linseed oil absorbed in grams, per 100 grams of titanium oxide). The titanium oxide is commercially available from Tronox, under the trade name CR-813.

It may also be a mixture of titanium dioxide and of calcium carbonate (advantageously between 60 and 97% by weight of calcium carbonate and between 3 and 40% by weight of titanium dioxide), such as, for example, the product FP-470 commercially available from FP-Pigments. The calcium carbonate, alone or in a mixture with titanium dioxide, may have a mean particle size ($D_{50}$) of between 0.3 μm and 3 μm, advantageously of 1 μm. It may have a (BET) specific surface area of approximately 10 $m^2/g$ and/or a density of approximately 2.8 $kg/dm^3$.

The content of opacifier c) of the correction fluid according to the invention is between 37 and 60% by weight, advantageously between 40 and 60% by weight, more advantageously between 40 and 50% by weight, in particular between 42 and 47% by weight, more particularly between 42 and 46% by weight, relative to the total weight of the correction fluid.

The correction fluid according to the present invention also comprises a resin d) which makes it possible to bind the opacifier to the paper and aids in the formation of a flexible but continuous film which covers what remains of the composition of the correction fluid once the solvent has evaporated. This resin is therefore advantageously a film-forming polymeric material. Advantageously, the resin is chosen from vinyl chloride polymers, acrylic resins and vinyl chloride/vinyl ether copolymers.

In particular, it is an acrylic resin, more advantageously a vinyl acrylate copolymer, even more advantageously a styrene acrylate copolymer. More particularly, this resin may be sold by Omnova solutions under the name PLIOWAY® EC1.

In an advantageous embodiment of the present invention, the content of resin d) in the correction fluid according to the invention is between 5 and 15% by weight, advantageously between 8 and 10% by weight, relative to the total weight of the correction fluid.

The correction fluid may also comprise an additive e) well known to those skilled in the art in the field of correction fluids based on organic solvent, in particular chosen from optical brighteners, wetting agents, fillers, plasticizers (for example, phthalates between 1 and 5% by weight relative to the total weight of the correction fluid), surfactants, rheological additives (for modifying the viscosity of the fluid, such as thixotropic agents) and mixtures thereof, advantageously from optical brighteners, rheological additives, wetting agents and mixtures thereof, more particularly from optical brighteners, wetting agents and mixtures thereof. In particular, the content of additive e) of the correction fluid according to the present invention is between 0 and 5% by weight, advantageously between 0 and 4% by weight, in particular between 0 and 3% by weight relative to the total weight of the correction fluid.

Thus, the correction fluid may comprise an optical brightener which makes it possible to cause the film to appear more or less white, in particular to make it possible to tint the correction fluid to bring it to the color of the paper, with the aim of having a "discreet" correction. It may thus be pigment dispersions or pastes based on carbon black, such as, for example, TINT AYD AL 317H from Elementis specialities or based on titanium oxide, such as, for example, TINT AYD AL 103 from Elementis specialities.

Advantageously, the content of optical brightener of the correction fluid according to the present invention, when it is present, is between 0.02 and 1.05% by weight, more advantageously between 0.5 and 1% by weight, in particular between 0.8 and 0.99% by weight, more particularly between 0.8 and 0.95% by weight, relative to the total weight of the correction fluid.

The correction fluid according to the present invention may also comprise a wetting agent. This wetting agent makes it possible to improve the dispersion of the pigments in the correction fluid.

As wetting agent, mention may be made of soy lecithin.

Advantageously, the content of wetting agent of the correction fluid according to the present invention, when it is present, is between 1 and 3% by weight, more advantageously between 1.5 and 2% by weight, relative to the total weight of the correction fluid.

The correction fluid according to the present invention may also comprise a filler. As filler, mention may for example be made of barium sulfate.

The correction fluid according to the present invention may also comprise a rheological additive.

As rheological additive, mention may be made of polyamide wax, such as that sold under the name DISPARLON A670-20M by KUSUMOTO CHEMICALS.

Advantageously, the content of rheological additive of the correction fluid according to the present invention, when it is present, is between 0.5 and 1% by weight, relative to the total weight of the correction fluid.

Advantageously, the dry extract of the correction fluid according to the present invention is between 55 and 62% by weight, in particular between 55.5% and 57.5% by weight, or between 58.5 and 61.5% by weight.

The correction fluid according to the present invention has excellent stability (in particular regarding coverage) on aging (advantageously for at least 1 month of storage at 40° C. and 20% relative humidity, even more advantageously for at least 2 months of storage at 40° C. and 20% relative humidity) and a great ease of rehomogenization (in particular, absence of sedimentation).

The correction fluid is produced by a process well known to those skilled in the art, in particular by dispersion then milling, for example using a bead mill, in particular with beads of a diameter between 0.8 and 1.0 mm, in particular for approximately between 20 and 30 minutes, in order to refine the fluid.

The present invention also relates to a device for applying a correction fluid, characterized in that it comprises the correction fluid according to the present invention. This application device may for example be of the correction fluid pen type or bottle type, with applicators of brush or foam type; in particular, it is a pen of Shake'n Squeeze® type, sold by BIC.

The present invention will be better understood in light of the following examples, given by way of nonlimiting indication.

Example 1: Correction Fluid According to the Invention

A formulation example is collated in table 1 below:

| INGREDIENTS | FUNCTION | % by weight | CAS no. |
|---|---|---|---|
| EXXSOL HEPTANE | Solvent | 21.54 | 64742-49-0 |
| ISOPAR E | Solvent | 21.54 | 64741-66-8 |
| PLIOWAY EC1 | Resin | 9.15 | 118922-88-6 |
| YELKIN TS (soy lecithin) | Wetting agent | 1.85 | 8030-76-0 |
| ANTI-TERRA-205 | Wetting and dispersing agent | 1.00 | 162627-17-0 107-98-2/64741-65-7 |
| TRONOX CR 813 | Opacifier | 44.00 | 13463-67-7 7631-86-9/21645-51-2/1314-23-4 |
| TINT-AYD AL 103 | Optical brightener | 0.89 | 13463-67-7 8052-41-3/96-29-7 |
| TINT-AYD AL 317 | Optical brightener | 0.03 | 1333-86-4 64742-82-1/64742-47-8/64742-88-7/8052-41-3/96-29-7/1330-20-7 |
|  |  | 100.00 |  |

Example 2: Correction Fluid According to the Invention

Another formulation example is collated in table 2 below:

| INGREDIENTS | FUNCTION | % by weight | CAS no. |
|---|---|---|---|
| EXXSOL HEPTANE | Solvent | 31.32 | 64742-49-0 |
| ISOPAR E | Solvent | 7.30 | 64741-66-8 |
| PLIOWAY EC1 | Resin | 9.69 | 118922-88-6 |
| YELKIN TS (soy lecithin) | Wetting agent | 1.96 | 8030-76-0 |
| ANTI-TERRA-205 | Wetting and dispersing agent | 1.00 | 162627-17-0 107-98-2/64741-65-7 |
| TRONOX CR 813 | Opacifier | 32.80 | 13463-67-7 7631-86-9/21645-51-2/1314-23-4 |
| FP-470 | Opacifier | 14.10 | 471-34-1 13463-67-7 |
| DISPARLON A670-20M | Rheological additive | 0.85 |  |
| TINT-AYD AL 103 | Optical brightener | 0.95 | 13463-67-7 8052-41-3/96-29-7 |
| TINT-AYD AL 317 | Optical brightener | 0.03 | 1333-86-4 64742-82-1/64742-47-8/64742-88-7/8052-41-3/96-29-7/1330-20-7 |
|  |  | 100.00 |  |

Example 3: Comparison of the Storage Stability and Rehomogenization Ability of the Correction Fluid According to the Invention with a Correction Fluid Containing DISPERBYK 130, ANTI-TERRA U, or ANTI-TERRA P instead of ANTI-TERRA 205

Results were compared between DISPERBYK 130 (comparative example 1), ANTI-TERRA U (comparative example 2), or ANTI-TERRA P (comparative example 3) and ANTI-TERRA 205 (example 1) at the same percentage introduction (1% by weight), based on the same formula (according to example 1).

All the tests were carried out with each fluid assembled in the "Shake'n Squeeze®" from BIC. The Shake'n Squeeze® is a correction instrument in the form of a pen, inside which there is correction fluid and a stirrer bar. The consumer shakes the instrument before use in order to rehomogenize the fluid which may have sedimented, and presses on the flexible body to cause fluid to exit onto the paper. The description of the tests is as follows:

"Starting"

This is a test for starting the product, carried out on at least 10 products to produce a mean. The instrument will undergo several cycles of shaking (from 1 to 6 depending on the grade obtained) on a platform shaker or oscillating shaker from HEIDOLPH, model PROMAX 2020 (or equivalent), and between each cycle:

by manually shaking (with the cap pointing downwards) from the top to the bottom over a height of approximately 50 cm, it is verified whether the bar is free within the instrument or whether it is caught in sedimented material which would prevent the fluid from being correctly rehomogenized—a score is given for this criterion, referred to as "shake back"—if the grade obtained is 10, this means that the bar was free from the 1st cycle. If the grade obtained is 0, this means that the bar is not "released" even after 5 cycles.

By a correction over 4 words, to verify whether the coverage is good—a score is given for the criterion referred to as "coverage". If the grade obtained is 10, this means that the correction is perfect—a grade of 0 if the correction is not proper. In order to carry out this test, the fluid is applied to each of the lines of a piece of 80 g/m² printer paper, on which the word "CORRECTION" is printed 4 times by an HP Officejet 6100 Model H611a inkjet printer containing black HP ink with the reference 932, so as to cover each word with wet fluid in a single application, without going back over it. The paper is then left to dry at room temperature in open air for 15 minutes, then the coverage of the film is verified visually using a TQC model VF0600 light cabinet or equivalent, fitted with incandescent light F type E27 (4×40 W, temperature 2700 K). A perfect correction means that the word must not be visible through the film and that the film must completely cover the 4 words.

Moreover, if the instrument does not start because of sedimented fluid blocking the tip, the product is categorized in the criterion "no start".

For accelerated aging in the climatic chamber set to 40° C. and 20% relative humidity, the instruments are stored in 2 positions: tip pointing upwards (point up) and tip pointing downwards (point down). The tip pointing downwards position is the most critical since the sedimented fluid may easily block the tip. Thus, the tests are carried out on at least 20 products (10 stored with the tip pointing downwards and 10 stored with the tip pointing upwards) after bringing back to room temperature for 24 hours.

"User Coverage"

This test carried out on 3 products to produce a mean makes it possible to visually assess the coverage of a correction product applied in the manner of a consumer and the possibility of rewriting on the dry film without damaging it. A Minitek APC or Mikron writing machine is used with a writing speed of 4.5 m/min, a writing angle of 70° C., a writing length of 10 m, a circumference of the circles of 100 mm, a spacing between the circles of 2.2 mm on Minitek APC (position 7 on Mikron) and axial rotation of the pencil every 100 circles, the machine being fitted with:

a ballpoint pen with blue, black and red solvent-based ink and ball diameter of 1 mm;
a gel pen with blue, black and red aqueous ink and ball diameter of 0.7 mm;
a rollerball pen with free ink that is blue, black and red and aqueous-based and ball diameter of 0.7 mm;
and also a piece of Baumgartner ISO 12757 paper.

After writing with the machine (drawing circles) with different inks, the machine drawings are left to dry in open air for 1 hour.

This test also uses forms comprising the word "CORRECTION" written 4 times and printed in black with a laser printer and in black, cyan, magenta and yellow with an inkjet printer (cartridge HP 932 for the black ink/cartridge HP 933 for the color) which are also left to dry in open air for 1 hour after printing.

In order to carry out the test, the correction fluid is applied by drawing a line 2 cm long (over the machine drawing) or, to correct the word "CORRECTION" (on the form), so as to cover each word or circle with wet fluid in a single application without going back over it. The paper is then left to dry at room temperature in open air for 30 minutes, then the coverage of the film is verified visually using a TQC model VF0600 light cabinet or equivalent, fitted with incandescent light F type E27 (4×40 W, temperature 2700 K). A perfect correction (grade of 10) means that the word/circle must not be visible through the film and that the film must completely cover the 4 words. A grade of 0 is assigned if the text or circle is clearly visible through the dry film.

Five minutes after the end of the test, the word "REWRITING" is written once on the corrected paper for each sample tested, using the ballpoint pen with black solvent-based ink and ball diameter of 1 mm (only in the case of laser and black inkjet printing). For each correction product tested, the quality of the rewriting is graded:

grade of 10 if the dry film is not damaged by rewriting.
grade of 0 if there is significant flaking off of the dry film and the rewriting is illegible.

Table 3 below collates the results obtained:

|  |  | Ex 1 | Comparative ex 1 | Comparative ex 2 | Comparative ex 3 |
|---|---|---|---|---|---|
| Results at T0 | Starting |  |  |  |  |
|  | Coverage: | 10 | 10 | 8.7 | 9 |
|  | User |  |  |  |  |

-continued

| | | Ex 1 | Comparative ex 1 | Comparative ex 2 | Comparative ex 3 |
|---|---|---|---|---|---|
| | coverage | | | | |
| | coverage | 10 | 10 | 10 | 10 |
| | rewriting | 10 | 10 | 10 | 10 |
| Results after 1 month of storage at 40° C. and 20% relative humidity | Starting POINT UP | | | | |
| | Shake back | 10 | 7.6 | 3.2 | 3.6 |
| | Coverage | 10 | 10 | 10 | 9.8 |
| | NO START | 0 | 0 | 0 | 0 |
| | POINT DOWN | | | | |
| | Shake back | 10 | 1.6 | 0 | 0 |
| | Coverage | 8.2 | 0 | 0 | 0 |
| | NO START | 0 | 5 | 5 | 5 |
| Results after 2 months of storage at 40° C. and 20% relative humidity | Starting POINT UP | | | | |
| | Shake back | 10 | 3.6 | 5.2 | 2.4 |
| | Coverage | 10 | 2.6 | 9.2 | 9.4 |
| | NO START | 0 | 0 | 0 | 0 |
| | POINT DOWN | | | | |
| | Shake back | 7.2 | 0 | 0 | 0 |
| | Coverage | 8 | 0 | 0 | 0 |
| | NO START | 0 | 5 | 5 | 5 |

These results confirm better effectiveness of Anti-terra 205 compared to Disperbyk 130, to Anti-terra P and to Anti-terra U on the criterion of stability of the fluid on aging and of ease of rehomogenization. It should in particular be noted that the fluid containing Disperbyk 130, Anti-terra P or Anti-terra U is difficult to rehomogenize and that many application devices containing this fluid no longer work after one month of aging.

Example 4: Comparison of the Storage Stability and Rehomogenization Ability of the Correction Fluid According to the Invention with a Correction Fluid Containing or Not Containing ANTI-TERRA 205

Results were compared between a correction fluid containing ANTI-TERRA 205 (ex 2) or not containing same, based on the same formula (according to example 2).

All the tests were carried out with each fluid assembled in a bottle with a foam type applicator consisting of a bottle and a cap provided with a stem, at the end of which the foam applicator is welded. The bottle is provided, at the neck thereof, with a small hollow piece of plastic (referred to as "wiper") to wipe off the applicator on the edge of the bottle. The consumer shakes the bottle before use in order to rehomogenize the fluid which may have sedimented, and uses the foam applicator to apply the fluid to the paper. The description of the tests is as follows:

"Starting"

This is a test for starting the product, carried out on at least 5 products to produce a mean. The instrument will undergo several cycles of shaking (from 1 to 6 depending on the grade obtained) on a platform shaker or oscillating shaker from HEIDOLPH, model PROMAX 2020 (or equivalent), and between each cycle:

By a correction over 4 words, to verify whether the coverage is good—a score is given for the criterion referred to as "coverage". If the grade obtained is 10, this means that the correction is perfect—a grade of 0 if the correction is not proper. In order to carry out this test, the fluid is applied, in a single pass and in 4 seconds, to each of the lines of a piece of 80 g/m² printer paper, on which the word "CORRECTION" is printed 4 times by an HP Officejet 6100 Model H611a inkjet printer containing black HP ink with the reference 932, so as to cover each word with wet fluid in a single application, without going back over it. The paper is then left to dry at room temperature in open air for 15 minutes, then the coverage of the film is verified visually using a TQC model VF0600 light cabinet or equivalent, fitted with incandescent light F type E27 (4×40 W, temperature 2700 K). A perfect correction means that the word must not be visible through the film and that the film must completely cover the 4 words.

"User Coverage"

This test carried out on 3 products to produce a mean makes it possible to visually assess the coverage of a correction product applied in the manner of a consumer and the possibility of rewriting on the dry film without damaging it. A Minitek APC or Mikron writing machine is used with a writing speed of 4.5 m/min, a writing angle of 70° C., a writing length of 10 m, a circumference of the circles of 100 mm, a spacing between the circles of 2.2 mm on Minitek APC (position 7 on Mikron) and axial rotation of the pencil every 100 circles, the machine being fitted with:

a ballpoint pen with blue, black and red solvent-based ink and ball diameter of 1 mm;

a gel pen with blue, black and red aqueous ink and ball diameter of 0.7 mm;

a rollerball pen with free ink that is blue, black and red and aqueous-based and ball diameter of 0.7 mm;

and also a piece of Baumgartner ISO 12757 paper.

After writing with the machine (drawing circles) with different inks, the machine drawings are left to dry in open air for 1 hour.

This test also uses forms comprising the word "CORRECTION" written 4 times and printed in black with a laser printer and in black, cyan, magenta and yellow with an inkjet printer (cartridge HP 932 for the black ink/cartridge HP 933 for the color) which are also left to dry in open air for 1 hour after printing.

In order to carry out the test, the correction fluid is applied over a length of 2 cm (over the machine drawing) or, to correct the word "CORRECTION" (on the form), so as to cover each word or circle with wet fluid in a single application without going back over it. The paper is then left to dry at room temperature in open air for 30 minutes, then the coverage of the film is verified visually using a TQC model VF0600 light cabinet or equivalent, fitted with incandescent light F type E27 (4×40 W, temperature 2700 K). A perfect correction (grade of 10) means that the word/circle must not be visible through the film and that the film must completely cover the 4 words. A grade of 0 is assigned if the text or circle is clearly visible through the dry film.

Five minutes after the end of the test, the word "REWRITING" is written once on the corrected paper for each sample tested, using the ballpoint pen with black solvent-based ink and ball diameter of 1 mm (only in the case of laser and black inkjet printing). For each correction product tested, the quality of the rewriting is graded:
  grade of 10 if the dry film is not damaged by rewriting.
  grade of 0 if there is significant flaking off of the dry film and the rewriting is illegible.

Table 4 below collates the results obtained:

|  |  | Ex 2 | Ex 2 without ANTI-TERRA 205 |
|---|---|---|---|
| Results at T0 | User coverage coverage | 10 | 10 |
|  | rewriting | 10 | 10 |
| Results after 1 month of storage at 40° C. and 20% relative humidity | Starting Coverage | 6.4 | 4.2 |
| Results after 2 months of storage at 40° C. and 20% relative humidity | Starting Coverage | 6.6 | 3.4 |
| Results after 6 months of storage at 40° C. and 20% relative humidity | Starting Coverage | 7.0 | 0 |

These results confirm the effectiveness of Anti-terra 205 on the criterion of stability of the fluid on aging and of ease of rehomogenization. It should in particular be noted that the fluid not containing Anti-terra 205 is difficult to rehomogenize after one month of aging.

The invention claimed is:

1. A correction fluid, comprising:
  a—an organic solvent,
  b—a dispersing and wetting agent comprising a polyamine amide of polycarboxylic acid obtained by reaction between a fatty acid dimer and a diamine, the fatty acid being a C14 to C22 fatty acid,
  c—an opacifier at a content of between 37 and 60% by weight relative to the total weight of the correction fluid,
  d—a resin,
  e—and optionally an additive.

2. The correction fluid as claimed in claim 1, wherein the fatty acid is a $C_{18}$ fatty acid.

3. The correction fluid as claimed in claim 1, wherein the diamine has the following general formula: $NR1R2(CH_2)_n NR3R4$, in which R1, R2, R3 and R4 represent, independently of one another, a hydrogen atom or a $C_1$-$C_6$ alkyl group, and n represents an integer between 1 and 6.

4. The correction fluid as claimed in claim 1, having a content of dispersing and wetting agent b) of between 0.01 and 10% by weight, relative to the total weight of the correction fluid.

5. The correction fluid as claimed in claim 1, wherein the organic solvent a) is chosen from aliphatic hydrocarbons.

6. The correction fluid as claimed in claim 1, having a content of organic solvent a) of between 25 and 75% by weight, relative to the total weight of the correction fluid.

7. The correction fluid as claimed in claim 1, wherein the opacifier c) is $TiO_2$.

8. The correction fluid as claimed in claim 1, having a content of opacifier c) of between 40 and 60% by weight, relative to the total weight of the correction fluid.

9. The correction fluid as claimed in claim 1, wherein the resin d) is an acrylic resin.

10. The correction fluid as claimed in claim 1, having a content of resin d) of between 5 and 15% by weight, relative to the total weight of the correction fluid.

11. The correction fluid as claimed in claim 1, wherein the additive e) is chosen from optical brighteners, wetting agents, fillers, a tint-modifying pigment, plasticizers, surfactants, rheological additives and mixtures thereof.

12. The correction fluid as claimed in claim 1 having a content of additive e) of between 0 and 5% by weight, relative to the total weight of the correction fluid.

13. The correction fluid as claimed in claim 11, having a content of optical brightener of between 0.02 and 1.05% by weight, relative to the total weight of the correction fluid.

14. The correction fluid as claimed in claim 11, having a content of wetting agent of between 1 and 3% by weight, relative to the total weight of the correction fluid.

15. A device for applying a correction fluid, comprising the correction fluid as claimed in claim 1.

16. The correction fluid as claimed in claim 1, wherein the polyamine amide of polycarboxylic acid is a polyamine amide salt of polycarboxylic acid.

17. The correction fluid as claimed in claim 2, wherein the fatty acid is a $C_{18}$ unsaturated fatty acid.

18. The correction fluid as claimed in claim 3, wherein R1, R2, R3 and R4 represent, independently of one another, a hydrogen atom or a methyl group and n=3.

19. The correction fluid as claimed in claim 4, having a content of dispersing and wetting agent b) of between 0.03 and 5% by weight, relative to the total weight of the correction fluid.

20. The correction fluid as claimed in claim 8, having a content of opacifier c) of between 40 and 50% by weight, relative to the total weight of the correction fluid.

* * * * *